Aug. 9, 1966  YAU TAK CHEUNG  3,265,016
FORTUNE COOKY MACHINE
Filed Sept. 25, 1963  2 Sheets-Sheet 1
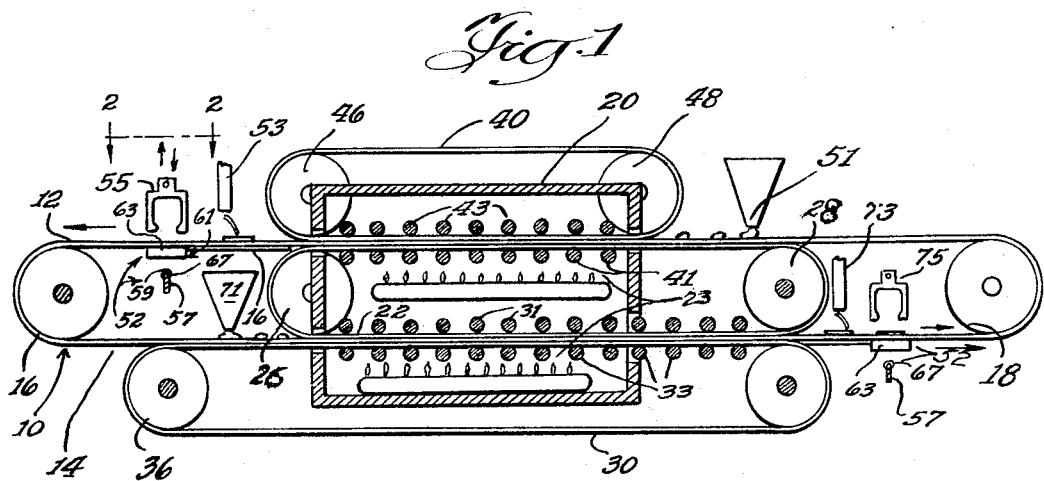
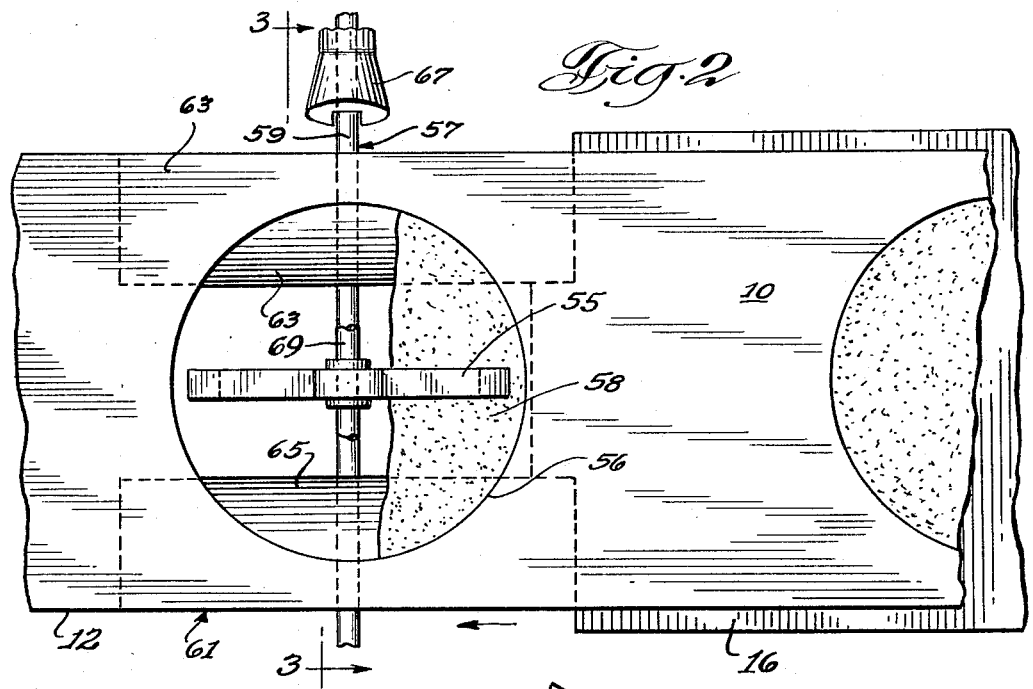
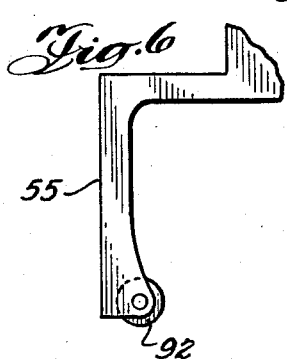
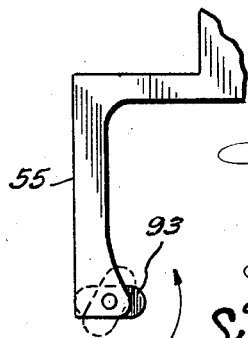
INVENTOR.
Yau Tak Cheung
BY
Silverman, Mullin, Cass & Raufman
Attorneys Aug. 9, 1966 — YAU TAK CHEUNG — 3,265,016
FORTUNE COOKY MACHINE
Filed Sept. 25, 1963 — 2 Sheets-Sheet 2
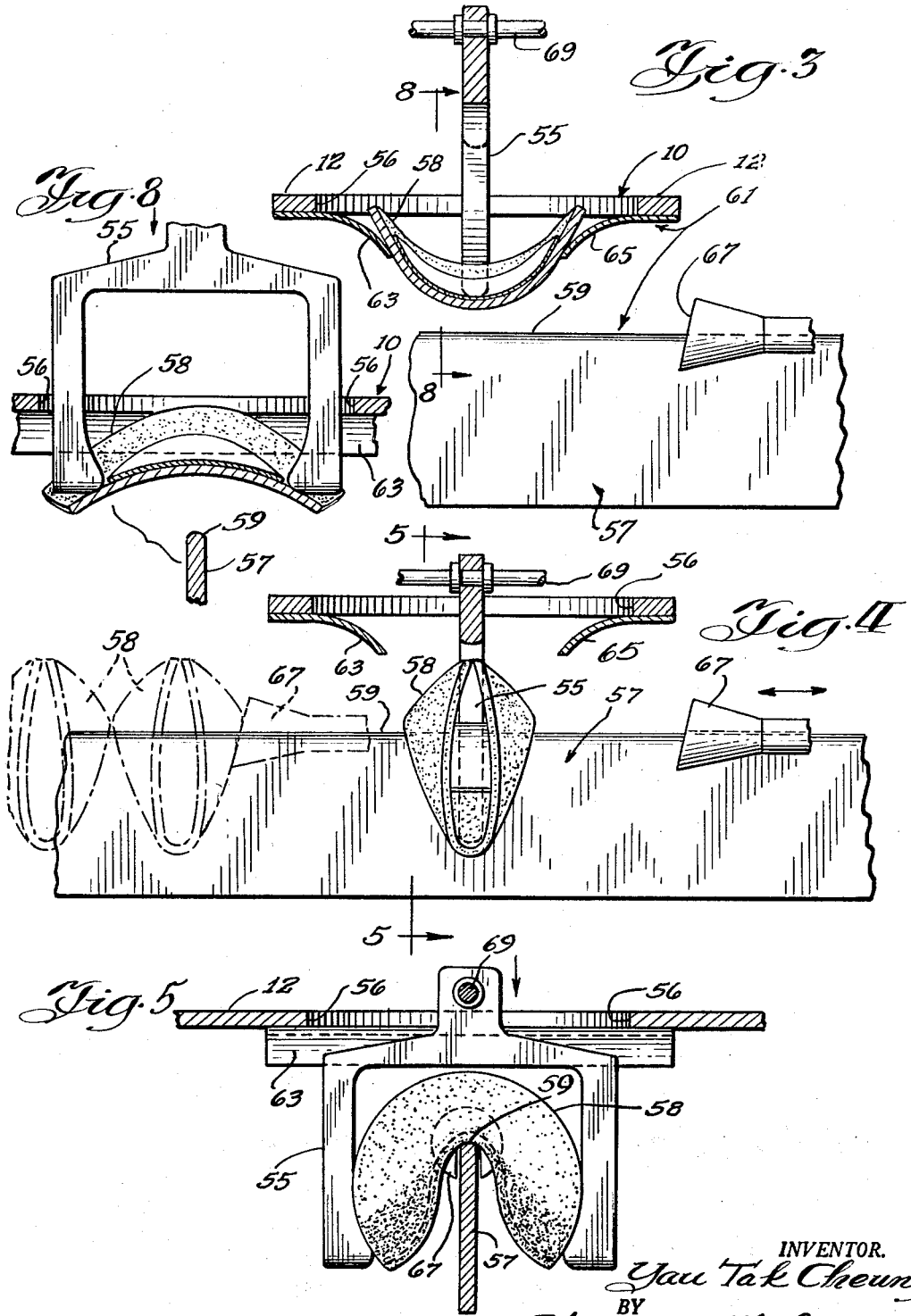

United States Patent Office 3,265,016
Patented August 9, 1966

3,265,016
FORTUNE COOKY MACHINE
Yau Tak Cheung, 6500 W. 64th St., Chicago, Ill.
Filed Sept. 25, 1963, Ser. No. 311,473
6 Claims. (Cl. 107—1)

This invention relates to the manufacture of cookies and more particularly to apparatus for forming and baking cookies of the complex configuration which are known as fortune cookies.

Heretofore it has been known to manufacture fortune cookies only by tedious hand formation of the well-known complex fortune cooky configuration. Thereafter the so-formed cookies were baked enmasse and the well-known fortune scripts inserted therein, all of this laboriously, tediously and expensively, of human skills.

Accordingly, it is an object of the present invention to eliminate the need for human processing of each individual cooky and to form cookies, bake them and insert the characteristic fortune script in a continuous mechanical operation.

It is a concomitant object of the invention to provide loop belt apparatus for continuously transporting fortune cooky dough through plural processing steps.

It is a still further object of the invention to provide apparatus for baking the cookies without interrupting the continuous movement thereof.

It is a still further object of the invention to provide apparatus for automatically removing fortune cookies from the processing apparatus.

It is a still further object of the invention to accomplish delicate and intricate formation of the individual cookies repetitively in automatic fashion.

These and other objects of the invention will be more clear and further features and advantages thereof will be apparent from a consideration of the following brief description of an illustrative embodiment of the invention shown in the drawings and from a consideration of the appended claims.

In the drawings:

FIG. 1 is an elevation view in partial section of cooky manufacturing apparatus in accordance with the invention;

FIG. 2 is an enlarged plan view taken on line 2—2 of FIG. 1 of a portion of a cooky forming structure in accordance with the invention;

FIG. 3 is a sectional view taken on line 3—3 of FIG. 2;

FIG. 4 is an elevation in partial section of an important structural element employed in an operational sequence of apparatus in accordance with the invention for production of fortune cookies;

FIG. 5 is an elevation view taken on line 5—5 of FIG. 4 of a cooky forming element for employment in apparatus in accordance with the invention;

FIG. 6 and FIG. 7 are fragmentary elevations of modified forms of structural elements for processing formed cooky structures in accordance with the invention;

FIG. 8 is a partially sectioned, elevation view of apparatus in accordance with the invention in operative engagement with cooky dough subsequent to the forming processes illustrated in FIG. 3.

The invention comprises generally a first carrier belt having an upper reach and a lower reach, said carrier belt being mounted for driving said reaches for horizontal motion in opposite directions. A second belt is looped interiorly of the carrier belt and is driven in contacting relation with interior portions of the carrier belt along portions of the upper reach and of the lower reach; a third and a fourth belt are mounted in exterior contacting relation with the carrier belt along the portions of the lower and upper reach thereof, respectively. The carrier belt comprises longitudinally spaced, central, open portions which correspond in dimension to a preassigned amount of cooky dough for an individual cooky to be manufactured. The carrier belt upper and lower reaches pass through a baking oven together with contacting portions of the second, third and fourth belts. A preassigned amount of cooky dough is metered into the central, open portions of the carrier belt and is supported therein by the below position contacting portions of the associated contacting one of said second, interior, and fourth, exterior, belts. This dough is retained in the central open portions of the carrier belt by the above positioned contacting ones of said second and fourth belts, thereby to define an amount of dough for an individual cooky blank.

Heating means are supplied within the oven for heating the dough of the cooky blanks to an appropriate consistency in passage through the oven, as is well known in the fortune cooky baking art. Conventional driving arrangements for the dough conveying belt are coordinated with the temperature of the oven in well known fashion of the bakers' art. The dough for such cookies, when so baked, achieves a substantially stable but, nonetheless, moldable consistency upon exit from the baking oven. There are provided in accordance with the invention, means for placing a fortune-printed slip of paper on the top of the successive ones of the cooky blanks thereafter. This occurs upon passage of the carrier belt beyond operative engagement with a below positioned one of said second and fourth belts. The lower surface of the carrier belt enters into engaged relation with an upper surface of a forming housing. This forming housing comprises a vertically positioned edge member arranged in a lateral disposition transverse to the longitudinal motion of the carrier web.

The dough, now heated and baked, is retained in the associated carrier belt opening simply by the normal expansion associated with the baking process but, it is to be noted, this blank still remains in a plastic condition. A downwardly operable plunger, having a bifurcated lower end, is positioned in operative relation with the aforementioned vertical edge member and in operative relation, too, with a first and a second downwardly sloping portion of the forming housing; these downwardly sloping portions slope toward one another and both slope transversely to the direction of longitudinal motion of the carrier belt. As the carrier belt passes over the upper surface of the forming housing, the bifurcated plunger is operated downwardly thereby to form the baked cooky blank disc in one plane about the vertical edge member. At the same time, this downward plunger motion acts to form the disc upwardly in a perpendicular plane by cooperative action of the plunger with the first and second sloping portions of the forming chamber. Thus, the cooky blank is formed roughly into a hyperboloid configuration which encloses the fortune slip and is positioned on the edge member. Upon retraction of the plunger, thereafter, a pusher member is arranged for motion along the longitudinal extent of the edge member for pushing the hyperboloid formed cooky off the edge member. This pusher member has a contacting surface configuration corresponding substantially to that of the associated end surface of the formed cooky.

Referring now more particularly to the drawings, in FIG. 1 there is seen in elevation view an arrangement of apparatus in accordance with the invention for automatically manufacturing fortune cookies in a continuously operative process. In this FIG. 1 there is shown a looped, first carrier belt 10 having an upper reach 12 and a lower reach 14 looped about drive rollers 16 and 18 which rotate, as shown, in a counter-clockwise direction to move the upper reach 12 of the belt 10 from right to left. This belt 10 is constructed of heat-resistant material, preferably of a flexible metallic material, and comprises circular open portions 56 longitudinally spaced therealong in laterally central disposition. The carrier belt is of such thickness and the dimensions of the several circular openings therein are so proportioned in relation to the amount of dough in an individual fortune cooky that each of these openings defines a cylinder for containing the dough necessary to the production of a single fortune cooky.

A second looped belt 22 is positioned within the loop of the carrier belt in contacting relation with an inner surface thereof along a first portion of the upper reach. Third and fourth looped belts 30, 40 are positioned in contacting relation with exterior portions of the carrier belt thereby to close the cylinders defined by the opened portions of this belt. All of the second, third and fourth belts are arranged about supporting rollers 26, 28, 36, 38, 46 and 48 at either end and are arranged, further, for longitudinal motion in correspondence with the motion of the contacting portion of the carrier belt. The second and fourth belts are positioned at a longitudinal position prior to passage of the carrier belt underneath an appropriate well-known cooky dough dispenser 51, 71. Each dispenser is arranged for introducing a metered amount of the cooky-forming dough into each of the successive openings 56 in one of the reaches of the carrier belt for supporting this dough by the belt reach positioned therebeneath. The dough-containing carrier belt is introduced into a baking oven 20 in the course of longitudinal motion in either of two opposite directions. This oven comprises well-known heating means such as gas burners 23.

The dough dispensers 51, 71 may be simply collapsible plastic containers having outlet nozzles for emitting a stream of contained dough. Thus, upon manual squeezing of the dispenser 51, 71 the dough is deposited on an upper surface of a below positioned belt. The quantity of this dough is usually metered by the area it covers on this belt. Alternatively, the dispensing mechanism may include a simple, fixed travel, reciprocating piston driven by an appropriate belt drive mechanism.

As the carrier belt passes through the oven 20, roller arrays 41 and 43, 31 and 33 provide support, respectively, for the belt portions contained within the oven 20. Looking to the upper reach 12 of the carrier belt 10, it is seen that the upper reach of the belt 22, disposed interiorly of the looped carrier belt 10, passes from the roller 28 into interior engagement with the looped belt 10, at a point exterior to the oven 20. Thus, there is established a contacting relation with the lower surface of the upper reach of the belt 10 prior to entry of the carrier belt central portions into the oven 20. Prior to this entry, a metered amount of cooky-forming dough is dispensed into a cylindrical container or opening formed in the carrier belt 10. This metered amount of cooky dough is passed into a circular opening in the carrier belt 10 from a well-known metering device 51. The amount of cooky dough so metered corresponds with that preassigned amount requisite for the formation of an individual fortune cooky. In the extremely plastic condition of the thus introduced cooky dough, the cooky blank so formed within the circular opening in the belt 10 is supported by an upper reach of the belt 22 positioned in contacting relation with the upper reach 12 of the belt 10. Thus the fresh dough does not fall from the circular opening in the carrier belt 10.

Upon entry into the heated oven 20, the upper surface of the upper reach 12 of the belt 10 enters into engaged relation with an upper belt 40. Thus this upper belt 40 serves to flatten the dough contained in the circular openings in the belt 12 and to flatten this dough into a uniform configuration under the urging of the support rollers 41 noted heretofore. Within the oven, this so-formed cooky disc is heated to a temperature such that, upon exit from the oven, the cooky blank is substantially baked.

Characteristic of this cooky dough, however, is the fact that this dough remains moldable after it has been adequately heated for thereafter forming a solid rigid cooky structure upon appropriate cooling. Thus, as the carrier belt is transported from right to left, the baked cooky blank, still plastic but, adhering circumferentially to the cylindrical opening in the belt 10, passes under a dispenser 53. This dispenser is arranged for dispensing a slip of paper having a fortune inscribed thereon centrally on the circular cooky disc upper surface. The noted dispenser 53 is no more than a container for manually loaded, paper, printed fortunes. As is well known in the art, this dispenser includes a simple dispensing orifice which is opened by linkage 69 to drop a fortune onto the cooky dough blank as it passes beneath the dispenser 53.

Passing from the fortune dispenser, the fortune carrying disc enters into the forming influence of forming apparatus 52 in accordance with the invention. A bifurcated plunger 55 is disposed for downward motion to urge the cooky disc downwardly through the circular opening in the belt 10 to form the blank circularly about a forming bar 57 having an upper edge portion 59 oriented as shown. This upper edge portion of the bar is disposed transversely of the direction of longitudinal motion of the belt 10. The plunger 55, in the course of downward motion, urges the cooky disc to a downward curvature in a plane from right to left through a forming member 61 having an upper surface in contacting relation with a lower surface of the carrier belt 10. As will be seen hereafter, this forming structure is arranged for cooperation with the downwardly operating plunger 55 to impart an upward curvature to the cooky disc in the plane transverse to that of the illustration of FIG. 1. This forming member 61 is discussed hereafter in greater detail in connection with the discussion of FIG. 3.

As the bifurcated plunger 55 urges the cooky blank downwardly about the upper edge of the forming bar 57, the cooky is thus curved downwardly in a plane corresponding to that of the drawing of FIG. 1. At the same time, other, opposite edges of the cooky are curved upwardly to a closed configuration in a perpendicular plane transverse to the direction of motion of the carrier belt 10.

Turning next to FIG. 2 there is seen in enlarged, partially sectioned, plan view some of the detailed structural elements for accomplishing this forming operation. In this plan view there is shown the upper reach 12 of the carrier belt 10 as this belt is transported beyond the roller 26 bearing a baked cooky 58 in the circular opening 56. Dashed lines illustrate various ones of the structural forming elements hidden from view by the cooky dough and the belt 10.

Two opposed, downwardly sloping portions 63, 65 of the forming member 61 are spaced apart transversely of the path of motion of the carrier belt 10. A forming bar 57 having an upper surface 59 extends transversely of the belt 10 and the bifurcated plunger 55 is disposed in operative relation therewith midway of the two laterally spaced surface portions 63, 65. A pusher member 67 is arranged for longitudinal motion along the bar 57 for pushing formed cookies from the bar upon upward (see FIG. 4) withdrawal of the plunger 55. This pusher member as shown in FIGS. 2, 3, 4 and 5, has a concave cross section corresponding to the desired side contour of a formed cooky such as the cooky 58 illustrated in FIG. 4. Actuating mechanisms for the pusher 67, the plunger 55, the dispensers 51, 71 and the belt 10 are not shown specifically in the drawings for avoiding undue complexity. These mechanisms in the apparatus of the invention are all of well-known types including a conventional rotary drive motor and suitable cam operated mechanisms for causing successive deposition of a fortune script on the cooky blank, operation downwardly of plunger 55, upward withdrawal of the plunger, transverse operation of the pusher 67 and subsequent return thereof.

Looking next to FIG. 3 there is seen in transverse end view the cooperative relation of the structural elements associated with the forming housing 61. Here the bifurcated plunger 55 is shown in the course of downward urging of a cooky blank 58 disposed in baked condition in the central opening 56 in the upper reach 12 of the belt 10. The blank 58 is upwardly curved by the downwardly sloping two opposite portions 63, 65 of the upper surface of the forming housing 61. In this view of FIG. 3 the plunger 55 is only in mid-course in its downward motion and accordingly the cooky blank is not yet in engagement with the forming bar 57 and the pusher member 67 is positioned well clear of the path of this member 55. A portion 69 of the well-known linkage mechanism for urging the plunger 55 downwardly in synchronism with the passage of the opening 56 therebeneath is shown. As will be evident from inspection of the plan view of FIG. 2 and the elevation view of FIG. 4, the linkage 69 is so arranged and timed in well known fashion that the plunger 55 operates downwardly through the transport belt opening 56 preceding by a fractional interval the reciprocal transverse movement of two oppositely acting pushers 67. The two cooperative pushers 67 are not both shown for simplicity in the drawings.

In FIG. 8 there is shown a partial section view of a portion of FIG. 3 indicated therein by section lines 8—8. This transverse view of a portion of the structure of FIG. 3 illustrates the downward curvature enforced upon the still somewhat plastic blank 58 by the bifurcated plunger 55 even prior to the engagement of the blank with the upper edge 59 of the forming bar 57. The downwardly sloping portion 63 of the housing 61 appears in this view, as well as does the opening 56 in the carrier belt 10.

Looking next to FIG. 4, there is seen an enlarged view of the structure of FIG. 3 in an operational stage subsequent to that of FIG. 3. In this FIG. 4 the bifurcated plunger 55 is operated fully in a downward direction to its lowermost position to fold the cooky blank 58 about the upper edge of the bar 57 as the upper edges of this cooky blank are brought to an upward enclosing configuration for the fortune script by the urging of the sloping portions 63, 65.

In FIG. 5 this operational stage is illustrated in greater detail in a view perpendicular to that of FIG. 4. Here the bifurcated member is shown at the lower limit of vertical travel having brought the cooky blank into engaged, downward forming relation with the upper surface of the forming bar 57. This FIG. 5 is illustrative of a sequential forming step subsequent to that of the, most nearly, comparable FIG. 8.

In FIGS. 6 and 7 there are illustrated important modifications for the bifurcated forming plunger 55 shown in the structure of FIG. 1. The forming member of FIG. 6 includes a roller 92 at an innermost cooky blank contacting corner, as shown. Rolling contact by the roller 92 for effecting downward folding of the cooky blank operates to preclude structural deformation of an engaged, baked, but plastic, cooky blank as this blank is formed downwardly about the upper edge of the vertical member 57. In this fashion, the cooling, baked dough is freed from the crumbling effects of a rigid forming plunger. Thus, the roller 92 acts much in the fashion of a rolling pin to knead the cooky dough into a desired configuration.

The bifurcated plunger of FIG. 7 comprises a rounded, end pivotal member 93, pivoted as shown, at a lower edge corner for gently engaging a still plastic cooky blank in forming relation without structural deformation thereof. This arrangement, alternative to that of FIG. 6, brings similar advantages of delicacy in forming of cookies.

Like elements, similarly numbered, perform similar cooperative functions with cooky dough transported by the lower reach 14 of the belt 10 from the dispenser 71 to the plunger 75.

Thus, apparatus in accordance with the invention automatically and continuously processes fortune cooky dough to a plurality of baked, and completed cookies, each containing a characteristic fortune script. All this is done without human attention beyond the supplying of the two different kinds of dispensers with cooky dough and fortune scripts respectively.

What is sought to be secured by Letters Patent of the United States is:

1. Apparatus for forming plastic, substantially planar blanks of plastic conditioned material releasably disposed in open portions of a longitudinally transported conveyor belt which comprises, a forming housing having an upper surface portion disposed in proximity with an under surface of said belt, said upper surface portion of said housing comprising first and second sloping portions disposed transverse of the longitudinal motion of said belt, said sloping portions being transversely spaced apart to provide an opening therebetween corresponding to the transverse positioning of the open portions of said belt, said housing further comprising a vertically positioned bar member extending between said spaced apart portions and having an upper edge portion positioned oppositely of said sloping portions of said upper surface, and a plunger having a bifurcated planar surface disposed perpendicular to said bar member, said plunger being operable bi-directionally along a line perpendicular to said conveyor belt into enfolding relation with said bar member upper edge portion for urging said plastic material blank from said belt open portion to fold said blank about said bar member upper edge portion in a first direction corresponding to one direction of motion of said plunger in a first plane corresponding to that of said plunger bifurcated planar surface, whereby said first and second sloping surfaces engage said plastic blank to fold said blank in a second, opposite direction from said bar member in a second, perpendicular plane.

2. Apparatus as set forth in claim 1 and, in combination therewith, a pusher member operable along said bar member upper surface to move said blank therealong and upon operation of said plunger in a second direction to disengage with said folded plastic blank, whereby said folded blank is moved from said bar member upper surface.

3. Apparatus for manufacture of a plurality of fortune cookies which comprises a first looped belt of flexible, heat resistant material, said belt being mounted in driven relation with first and second rollers to define an upper belt reach and a lower belt reach, a baking oven enclosing central portions of said driven upper and lower belt reaches, a plurality of openings longitudinally spaced along said belt and dimensioned for defining the amount of cooky dough for an individual cooky, a second looped belt of flexible heat resistant material mounted for contacting interior surfaces of said first looped belt central portions, said second looped belt extending outwardly of said oven to contact said first belt upper reach to a first point, thereby to support cooky dough in contacting ones of said upper reach openings and to retain cooky dough in contacting ones of said first belt lower reach openings, a third looped belt of flexible, heat resistant material positioned to contacting relation with an exterior surface of said first belt lower reach from a second point prior to entry of said belts into said oven, first and second dough supplying means for placing a preassigned amount of dough into said first belt openings upon passage of said openings thereby, said dough supplying means being respectively positioned above said first belt upper and lower reaches and longitudinally between said first and second points and said oven, fortune script dispensing means for positioning fortune scripts on cooky dough blanks in said first belt openings upon exit thereof from said oven and extracting means operable on said cooky blanks subsequent to positioning thereon of said fortune scripts for extracting said blanks from said openings and for folding said blanks upwardly in a first plane to enclose said scripts and downwardly in a perpendicular plane to form said blanks to a characteristic configuration.

4. Apparatus as set forth in claim 3 and, in combination therewith, disposal means operable subsequent to operation of said extracting means for removing cooky blanks from said apparatus.

5. Apparatus as set forth in claim 4 wherein said extracting means comprises a vertically operable plunger having a downwardly concave surface for engaging baked cooky dough blanks in said openings, an apertured plate positioned in contacting relation with a lower surface of said first belt beyond said oven, said plate having first and second spaced apart, downwardly sloping portions fixed to opposite lateral edge portions of said plate.

6. A fortune cooky making machine which comprises an elongated, looped, conveyor belt constructed of heat resistant material, said belt having upper and lower reaches and regularly spaced openings therein, the dimensions of said openings and the thickness of said belt being commensurate with the amount of dough contained in a fortune cooky to be manufactured, thereby to define an individual cooky blank, drive means for moving said looped belt continuously, an oven for baking cooky dough therein, said oven being disposed and adapted for allowing transit therethrough of an upper reach and a lower reach of said belt, said drive means being coordinated with the temperature of said oven for baking cooky dough in said openings in the course of transit of upper and lower belt reaches through said oven, a second looped belt disposed for movement in contact with inner surfaces of said looped belt in said oven from a first point exterior to said oven on said upper reach prior to entry into said oven, a third looped belt having an upper reach disposed for movement in contact with an outer surface of said first named conveyor belt lower reach from a second point exterior to said oven on said last named belt prior to entry into said oven, first and second dispensers disposed above said upper and lower reaches, respectively, between said first and second points and said oven for metering a preassigned amount of cooky dough into a spaced opening positioned therebeneath for transport through said oven, a fourth looped belt positioned for movement in contact with an outer conveyor belt surface from another point between said first dispenser and said oven through said oven for retaining cooky dough in said upper reach openings through said oven, first and second script dispensers respectively positioned above said conveyor belt upper and lower reaches upon exit thereof from said oven, said script dispensers being operable for dispensing a fortune script on a baked cooky blank therebeneath, a forming housing having an upper forming member positioned in contacting relation with said conveyor belt upper and lower reaches after passage through said oven, the forming member comprising first and second spaced apart portions oppositely inclined from said belt along the path of motion thereof, said housing further having a vertically positioned bar member, having an upper edge positioned beneath the spaced apart first and second portions, a bifurcated plunger positioned transversely of the motion, operable vertically of said belt upon passage of a baked cooky blank thereunder to urge said cooky blank downwardly onto said bar member upper edge against the restraining influence of said oppositely sloping housing portions, whereby said blank is folded upwardly by said portions to a closed configuration in a plane corresponding to that of said vertically positioned bar member and is further folded downwardly in a transverse plane about said bar member edge by said plunger, and extractor means operable along said bar member edge for moving said folded about cooky from said bar member upon vertical movement of said plunger from folding engagement with said cooky blank.

References Cited by the Examiner

UNITED STATES PATENTS

| 2,003,578 | 6/1935 | Clement | 107—1 |
| 2,960,045 | 11/1960 | Pentzlin | 107—54 |

FOREIGN PATENTS

| 474,406 | 11/1914 | France. |
| 5,990 | of 1914 | Great Britain. |

WALTER A. SCHEEL, *Primary Examiner.*

JOSEPH SHEA, *Assistant Examiner.*